UNITED STATES PATENT OFFICE.

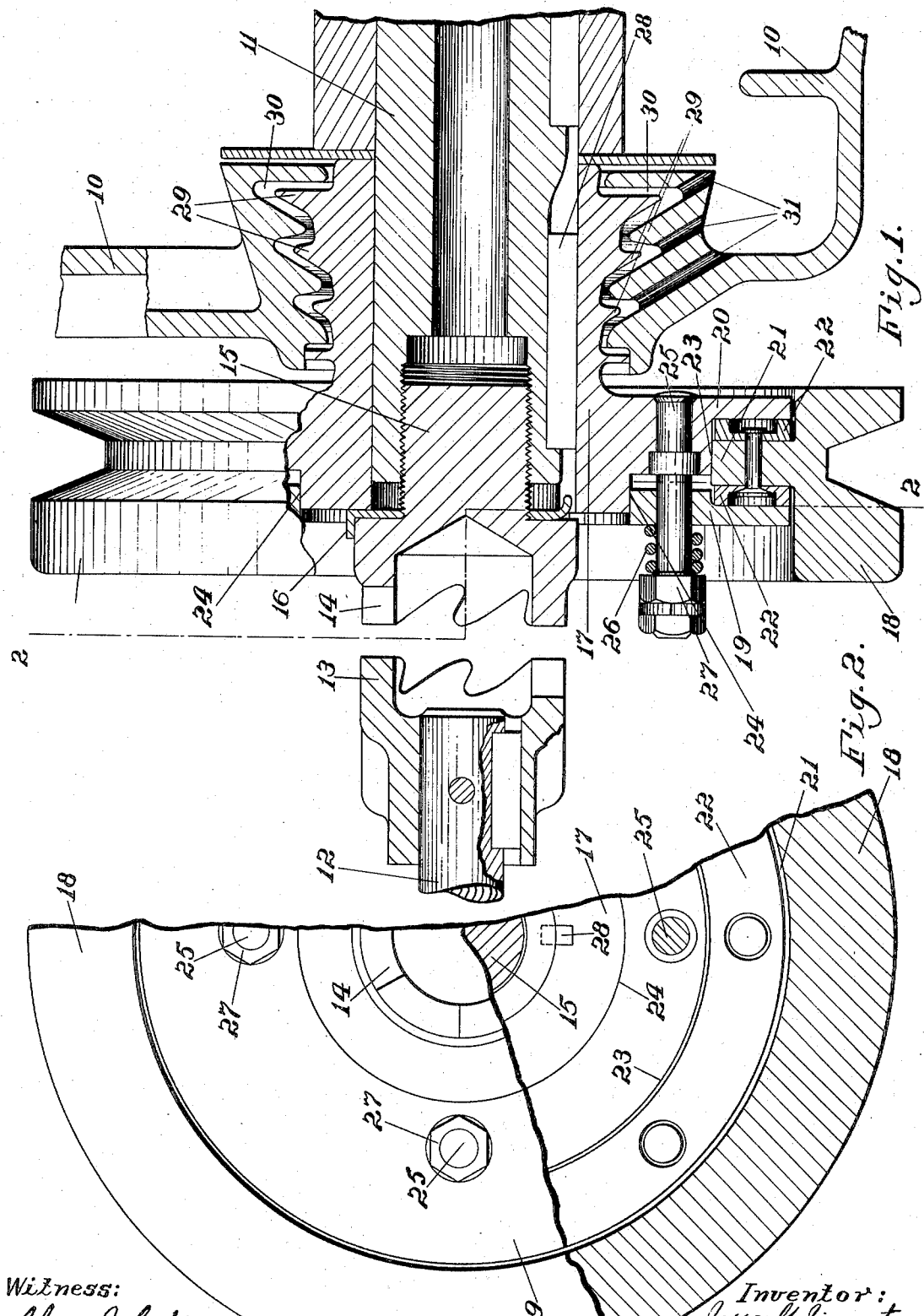

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

VIBRATION DAMPING DEVICE.

1,315,058.  Specification of Letters Patent.  Patented Sept. 2, 1919.

Application filed October 7, 1915. Serial No. 54,523.

*To all whom it may concern:*

Be it known that I, JESSE G. VINCENT, a citizen of the United States, and resident of Detroit, Wayne county, State of Michigan, have invented certain new and useful Improvements in Vibration Damping Devices, of which the following is a specification.

This invention relates to hydrocarbon motors and particularly to vibration damping means therefor. Specifically the invention relates to the construction of a device known as a "vibration damper," which usually consists of a relatively small flywheel yieldingly mounted in connection with the end of the crank shaft remote from the end to which the main flywheel is connected. The primary purpose of such devices is to damp out or reduce torsional vibrations set up in the crank shaft usually caused by one or more of the impulses being imparted to the shaft in substantial synchronism with the natural period of vibration of the shaft. These vibrations are usually referred to as "periodic torsional vibrations" as they occur at certain periods only in the various speeds of a motor.

One of the objects of the present invention is to produce a device such as that referred to, of simple and inexpensive construction, one that will be efficient in operation, and that may have its wearing parts easily removed and replaced.

A practical embodiment of the invention is illustrated herein, but it will be understood that the invention is not limited to the exact construction shown.

Other objects of the invention will appear from the following description taken in connection with the drawings which form a part of this specification, and in which:—

Figure 1 is a vertical longitudinal sectional view through a portion of a motor embodying this invention; and Fig. 2 is a front view with parts broken away, being approximately on the line 2—2 of Fig. 1.

Referring to the drawings, 10 represents the forward part of the crank case of a hydrocarbon motor, and 11 is the crank shaft which is mounted in suitable bearings not shown. It will be understood that this crank shaft is of the usual type, having several cranks and a flywheel secured to it at its rear end whereby it is subjected to the periodic torsional vibration above referred to. The front end of the crank shaft extends through an opening in the crank case as shown in the drawing and a vibration damper is mounted on this projected end. The crank shaft is also adapted to be operated by hand for starting the motor through a suitable starting crank 12, having clutch jaws 13 which are adapted to coöperate with similar clutch jaws 14 on a nut or member 15 shown as threaded into the end of the crank shaft and as coöperating in the attachment of the vibration damper to the crank shaft. The nut 15 may be locked in position as by the lock washer 16. It will be understood that the starting crank 12 may be mounted in any suitable support not shown, and it may be moved axially toward the crank shaft until the jaws 13 and 14 engage and said jaws will automatically disengage when the motor starts.

The vibration damper above referred to consists primarily of three parts, an inner member 17, an outer or flywheel member 18, and a disk member 19. The inner member 17 is formed with a radial stepped flange 20 and the flywheel 18 has an inwardly extending flange 21 which is arranged between the outer part of the flange 20 and the disk 19. The flange 21 has friction facings or linings 22 which contact with the respective faces of the disk 19 and flange 20 as shown clearly in Fig. 1 of the drawing. Also, the flange 21 of the flywheel 18 is adapted to fit accurately upon one of the cylindrical stepped portions 23 of the inner member 17, whereby the flywheel is centered upon and adapted to rotate relatively to the inner member 17. The disk 19 is adapted to fit accurately upon another stepped portion 24 of the inner member 17, thus also centering the disk 19.

The disk 19 is adapted to rotate with the inner member 17 and to be yieldingly pressed toward it by means in the form of a series of pins 25 mounted in the flange 20 of the inner member 17 and extending through suitable openings in the disk 19. Springs 26 are arranged on the pins 25 and bear against the disk 19 and against nuts 27 adjustable on the ends of the pins 25.

It will be understood that the inner member 17 is suitably keyed upon the end of the crank shaft as by the key member 28, and the nut 15 above referred to bears against the end of the inner member 17 and thereby holds it in place.

For the purpose of preventing oil from escaping around the projecting end of the crank shaft, the member 17 extends inwardly some distance and is provided with a series of flanges 29, which coöperate with annular grooves 30 and drain holes 31 to carry back into the crank case any oil that may reach those parts.

Having thus described my invention, what I claim and desire to secure by Letters Patent is:—

1. In a motor, the combination with the crank shaft, of a vibration damper mounted at one end thereof and having a member keyed to said shaft, and a starting clutch jaw device threaded to said shaft and holding said keyed member in position.

2. In a motor, the combination with the crank shaft, of a vibration damper mounted thereon comprising an inner member having a plurality of stepped portions, a flywheel on said crank shaft and having a rim and an inwardly projecting flange, said flywheel being centered in position by the contact of the flange with the outer stepped portion, a disk member mounted on the inner stepped portion and movable axially of the inner member, the flange being arranged between the inner member and the disk, friction linings separating said flange from said inner member and said disk, said rim surrounding the disk and inner member and out of contact therewith, a series of pins on said inner member and passing through said disk and springs on said pins bearing against said disk to force it toward said inner member and into closer contact with said flange.

3. In a motor, the combination with the crank shaft, of a vibration damper mounted thereon comprising an inner member having a stepped portion, a fly wheel on said crank shaft and having a rim and an inwardly projecting flange, said fly wheel being centered in position by the contact of the flange with the stepped portion, a disk member movable axially of the inner member, the flange being arranged between and frictionally engaged by the inner member and the disk member, said rim surrounding and out of contact with the disk and inner member and means yieldingly pressing the disk toward the inner member and causing it to rotate therewith.

In testimony whereof I affix my signature.

JESSE G. VINCENT.